United States Patent
Ajello et al.

(10) Patent No.: US 6,982,510 B1
(45) Date of Patent: Jan. 3, 2006

(54) LOW PROFILE FLUID DYNAMIC BEARING

(75) Inventors: Anthony Joseph Ajello, Aptos, CA (US); Klaus Dieter Kloeppel, Watsonville, CA (US); Gregor Paco Flores, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 84 days.

(21) Appl. No.: 10/099,205

(22) Filed: Mar. 13, 2002

Related U.S. Application Data

(60) Provisional application No. 60/342,681, filed on Dec. 20, 2001.

(51) Int. Cl.
*H02K 7/09* (2006.01)
*H02K 21/22* (2006.01)

(52) U.S. Cl. .................. 310/90; 310/51; 310/67 R; 310/90.5; 360/99.08; 384/100; 384/121

(58) Field of Classification Search ............ 310/90, 310/67 R, 90.5, 51; 360/99.08; 384/100, 384/121, 123
See application file for complete search history.

(56) References Cited

U.S. PATENT DOCUMENTS

| | | | |
|---|---|---|---|
| 4,200,344 A | 4/1980 | Binns et al. | |
| 4,557,610 A | 12/1985 | Asada et al. | |
| 5,018,881 A | 5/1991 | Asada | |
| 5,089,732 A | 2/1992 | Konno et al. | |
| 5,112,141 A | 5/1992 | Asada et al. | |
| 5,142,173 A | 8/1992 | Konno et al. | |
| 5,426,548 A | 6/1995 | Fujii et al. | |
| 5,559,382 A | 9/1996 | Oku et al. | |
| 5,647,672 A | 7/1997 | Fukutani | |
| 5,683,183 A | 11/1997 | Tanaka et al. | |
| 5,710,678 A * | 1/1998 | Leuthold et al. .......... 360/99.08 | |
| 5,715,116 A | 2/1998 | Moritan et al. | |

(Continued)

FOREIGN PATENT DOCUMENTS

DE     10030763 A1    6/2000

(Continued)

OTHER PUBLICATIONS

PCT Int'l Search Report Dec. 12, 2002 PCT.

*Primary Examiner*—Darren Schuberg
*Assistant Examiner*—David W. Scheuermann
(74) *Attorney, Agent, or Firm*—Morrison & Foerster LLP

(57) ABSTRACT

The design comprises a shaft and sleeve supported for relative rotation by a journal type fluid dynamic bearing utilizing grooves on one of the shaft or sleeve surfaces. A grooved pattern of a design similar to that usually found on a thrust plate is defined on an axial end surface of the shaft or the counterplate facing the axial end of the shaft, so that thrust is created to maintain separation of the end of the shaft and the facing thrust plate during relative rotation.

In one embodiment, to establish and maintain the gap between the shaft end and the facing counterplate, the journal bearing has an asymmetry to pump toward the shaft end having the bearing. In a further refinement, to maintain the shaft and gap within an optimum spacing, a magnet is mounted to provide an axially directed magnetic force on the shaft which works against the axial force created by shaft end thrust bearing.

To prevent separation of the shaft and sleeve or hub, the hub which is integrated with a rotating shaft, further incorporates a shoulder which extends axially beneath a cooperating shoulder on the sleeve surrounding the shaft to prevent any more than a limited axially displacement of the hub and shaft relative to the sleeve.

28 Claims, 7 Drawing Sheets

U.S. PATENT DOCUMENTS

| | | | |
|---|---|---|---|
| 5,718,516 A | 2/1998 | Cheever et al. | |
| 5,723,927 A | 3/1998 | Teshima | |
| 5,744,882 A | 4/1998 | Teshima et al. | ........... 310/67 R |
| 5,914,832 A | 6/1999 | Teshima | |
| 5,969,448 A | 10/1999 | Liu et al. | |
| 5,977,674 A * | 11/1999 | Leuthold et al. | ............... 310/90 |
| 5,998,898 A * | 12/1999 | Fukutani et al. | ............... 310/90 |
| 6,034,454 A | 3/2000 | Ichiyama | |
| 6,172,847 B1 * | 1/2001 | Sakatani et al. | .......... 360/99.08 |
| 6,188,152 B1 | 2/2001 | Wakitani et al. | |
| 6,205,110 B1 | 3/2001 | Miyamoto et al. | |
| 6,211,592 B1 | 4/2001 | Ichiyama | |
| 6,252,322 B1 * | 6/2001 | Kawawada et al. | ............ 310/90 |
| 6,271,612 B1 * | 8/2001 | Tanaka et al. | ................. 310/90 |
| 6,307,293 B1 * | 10/2001 | Ichiyama | .................... 310/90.5 |
| 6,339,270 B1 | 1/2002 | Ichiyama | |
| 6,364,532 B1 | 4/2002 | Yoshikawa et al. | |
| 2002/0185925 A1 * | 12/2002 | Yoshikawa et al. | ........ 310/67 R |

FOREIGN PATENT DOCUMENTS

| | | |
|---|---|---|
| JP | 2001124085 | 5/2001 |

* cited by examiner

LOW PROFILE FLUID DYNAMIC BEARING

CROSS REFERENCE TO A RELATED APPLICATION

This application claims priority to a Provisional Application Ser. No. 60/342,681, filed Dec. 20, 2001, in the names of Aiello, Kloeppel and Flores, which application is incorporated herein by reference.

FIELD OF THE INVENTION

This invention relates to fluid dynamic bearing motors, and more particularly to such motors without thrust plate.

BACKGROUND OF THE INVENTION

Disc drive memory systems have been used in computers for many years as storage space for digital information. Information is recorded on concentric memory tracks of magnetic discs that rotate around a spindle. Information is accessed by read/write heads located on a pivoting arm which moves radially over the surface of the disc. The read/write heads (-transducers-) must be accurately aligned with the storage tracks on the disc to ensure proper reading and writing of information.

The discs are rotated at high speeds in an enclosed housing by means of an electric motor located inside the hub or below the discs. Such a motor is commonly known as a spindle motor. Such spindle motors typically have a spindle mounted by means of two ball bearing systems to a motor shaft in the hub. One of the bearings is located near the top of the spindle and the other near the bottom. These bearings allow for rotational movement between the shaft and the hub while maintaining accurate alignment of the spindle and the shaft. The bearings are normally lubricated by grease or oil.

The conventional bearing system described above is prone, however, to several shortcomings. First, vibration is generated by the balls rolling on the raceways. Ball bearings used in hard disk drive spindles run under conditions that often cause physical contact between raceways and balls in spite of the lubrication layer provided by the bearing oil or grease. Hence, ball bearings running on the apparently even and smooth, but microscopically uneven and rough, raceways transmit surface and circular imperfections in the form of vibration to the rotating disk. This vibration results in misalignment between the data tracks and the read/write transducer. These imperfections reduce the lifetime and effectiveness of the disc drive system.

Another problem is related to the use of hard disk drives in portable computer equipment and the resulting requirements for shock resistance. Shocks create relative acceleration between the disks and the drive casting. Since the contact surface in ball bearings is very small, the resulting contact pressures may exceed the yield strength of the bearing material and leave permanent deformation and damage on raceways and balls.

Moreover, mechanical bearings are not always scaleable to smaller dimensions. This is a significant drawback since the tendency in the disc drive industry has been to continually shrink the physical dimensions of the disc drive unit, as well as operate the units at ever-increasing speeds.

Another problem is that of potential leakage of grease or oil into the atmosphere of the disc drive, or outgassing of the components into this atmosphere. Because of the extremely high tolerance required for smaller radial spacing between tracks on the disc and the gap in the transducer which is used to read and write data on the disc, discs are located within sealed housings in which contaminants cannot be tolerated.

As an alternative to conventional ball bearing spindle systems, hydrodynamic bearing spindle systems have been developed. In these types of systems, lubricating fluid (gas or liquid) functions as the bearing surface between a stationary base housing and the rotating spindle/hub. For example, liquid lubricants including oil, more complex ferro-magnetic fluids, or even air have been utilized in hydrodynamic bearing systems. Air is popular because it is important to avoid the outgassing of contaminants into the sealed area of the head disc housing. However, air cannot provide the lubricating qualities of oil or the load capacity. Its low viscosity requires smaller bearing gaps and therefore higher tolerance standards to achieve similar dynamic performance. The liquid lubricant must be sealed within the bearing to avoid a loss which would result in reduced bearing load capacity and life. Otherwise, the physical surfaces of the spindle and of the housing would come into contact with one another leading to accelerated wear and eventual failure of the bearing system.

In the prior art, seals for containing the fluid within the disc drive utilize a pressurized film on the surface of the liquid air interface, or surface tension. In the case of bearing assemblies which employ ferro-magnetic fluids, the seal is achieved by means of a magnetic field established at each end of the bearing.

A shortcoming of known hydrodynamic bearings includes the fact that many prior art hydrodynamic bearing assemblies require large or bulky structural elements for supporting the axial and radial loads, as many hydrodynamic bearings do not have the inherent stiffness of mechanical bearing assemblies. It is difficult to scale the structural support elements to fit within the smaller disc drive dimensions currently in demand. In other instances, hydrodynamic bearing assemblies require extremely tight clearances and precise alignments. This burden makes it difficult to manufacture such assemblies since even a small deviation or aberration can lead to faulty bearings. Further, as the gaps in which the fluid is located become smaller, the power consumed to rotate the spinning elements.

Another consideration is that the data track density on hard discs has been decreasing, and track mis-registration, commonly known as TMR, is becoming increasingly critical. One of the primary contributors to TMR is disc spindle runout. It consists of both repeatable runout and non-repeatable runout, commonly referred to as NRRO. The NRRO of a ball bearing motor is often too high for today's disc drives. However, fluid dynamic bearings (FDB) provide a much lower NRRO, which better supports the high aerial data densities of current disc drive technology.

The architecture of fluid dynamic spindles in the past has generally included a shaft in a housing, which provides radial stiffness, and a thrust bearing, which controls the vertical position of the spindle. Both the shaft and thrust bearing have generally been cushioned by a fluid film. The journal and shaft surfaces have typically been provided with miniature grooves, which create pressure by directing the fluid into specific areas of the journal.

One problem with this conventional FDB spindle motor arrangement is that it limits the degree to which the height of the motor assembly may be reduced. This is because the thickness of the thrust bearing must be added to the length of the shaft, which itself must be of a length sufficient to provide rotational stability. Moreover, use of a thrust bearing increases the amount of friction the motor must overcome during operation, increasing power consumption.

In the field of fluid dynamic bearing motors for use in hard disc drives, some prior systems including, but not limited to, small form factor motor designs for mobile applications have been limited by stringent power requirements. In the traditional "single-plate" FDB design, a thrust plate with two equal and opposing thrust bearings is affixed to the journal bearing shaft to provide axial stiffness. This approach results in bear gaps at large diameters, thereby increasing bearing drag and overall motor power.

SUMMARY OF THE INVENTION

It is an objective of the invention to provide a hydrodynamic bearing which is simple and scalable in design, which diminishes the amount of power consumed during rotation while maintaining dynamic performance under operating vibration conditions.

It is another objective of the invention to diminish the power losses or power consumption associated with use of the thrust plate mounted on a shaft.

It is a related objective of the invention to provide a reduction in the overall height of the motor by elimination of the thrust plate.

Another objective of the invention is to reduce the friction and make the motor more efficient while permitting operation using lower power (power= current×voltage) by elimination of the thrust plate.

In another objective of the invention is to provide a bearing design for use in a spindle motor which also is designed to prevent separation of the parts of the bearing when the motor is inverted or subjected to shock, even lacking a thrust plate.

These and other objectives of the invention are achieved in the design comprising a shaft and sleeve supported for relative rotation by a journal type fluid dynamic bearing utilizing grooves on one of the shaft or sleeve surfaces. A grooved pattern of a design similar to that usually found on a thrust plate is defined on an axially end surface of the shaft or the counterplate facing the axial end of the shaft, so that thrust is created to maintain separation of the end of the shaft and the facing thrust plate during relative rotation.

In one embodiment, to establish and maintain the gap between the shaft end and the facing counterplate, the journal bearing has an asymmetry to pump toward the shaft end having the bearing. In a further refinement, to maintain the shaft and gap within an optimum spacing, a magnet is mounted to provide an axially directed magnetic force on the shaft which works against the shaft end thrust bearing.

In further optional features, to prevent separation of the shaft and sleeve or hub, in one embodiment the hub which is integrated with a rotating shaft, the hub further incorporating a shoulder which extends axially beneath a cooperating shoulder on the sleeve surrounding the shaft to prevent any more than a limited axially displacement of the hub and shaft relative to the sleeve.

In yet another alternative embodiment, the shaft comprises a phosphor bronze. This is typically used with the shaft supporting the hub and rotating inside a steel sleeve. This phosphor bronze has a thermal expansion rate which offsets the change in viscosity at higher temperatures; it further weakens the bearing at colder temperatures by expanding the gap between the phosphor bronze surface and the surrounding steel sleeve, thereby lowering the asymmetric pressure acting on the end of the shaft, and reducing the power needed to rotate the shaft.

In yet another enhancement, the center region of either the shaft or the plate on which the shaft rests may be defined to comprise a raised island, to provide a very small touchdown surface, minimizing the worn region of the shaft and facing counterplate.

In yet another enhancement, the shaft and surrounding sleeve each comprise a radially directed limiting shoulder, the shaft and sleeve shoulders all rely on one another to prevent decoupling of the shaft and sleeve under shock conditions.

In yet another alternative embodiment, to provide further robustness to the start/stop induced wear which is created by friction between the end of the shaft and the facing counterplate, a diamond-like coating (DLC) may be applied to the counterplate surface or to the end of the shaft; further, either the counterplate or shaft may be made out of ceramic material to enhance this performance.

Other features and advantages of the invention may be apparent to a person of skill in the art who studies the following description of preferred embodiments given with reference to the figures briefly described below.

DETAILED DESCRIPTION OF THE PREFERRED EMBODIMENTS

The following description of a preferred embodiment of the invention is given with reference to its use in a disc drive, since disc drives are especially directed to incorporating motors of a low profile. However, the present invention may also be useful in many other formats and environments.

Figure 1:
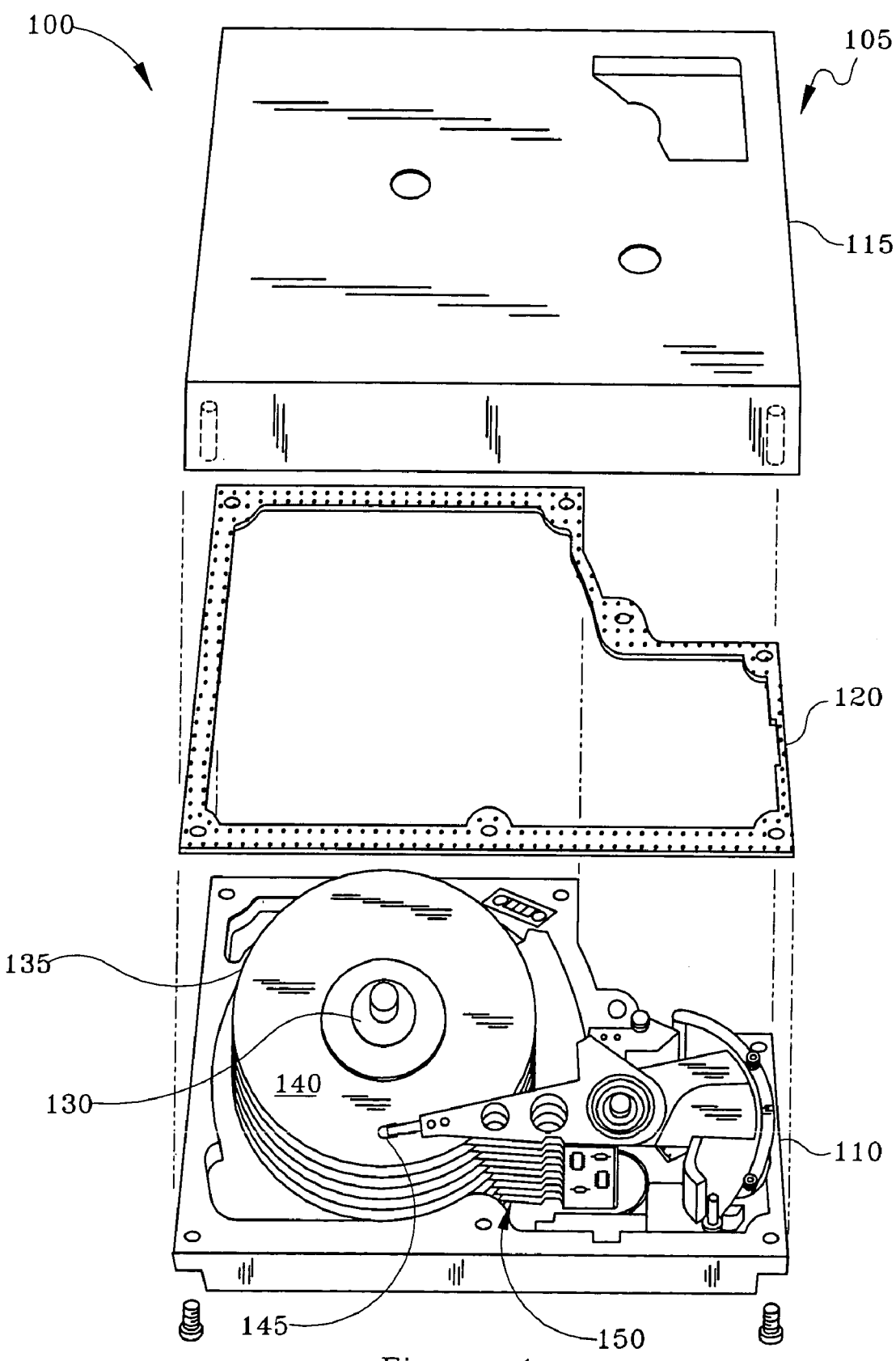
FIG. 1 is a perspective view of a disc drive in which the present design is useful.

Thus, as an exemplary environment for use in the present invention, FIG. 1 shows an exploded perspective view of a disc drive storage system in which the present bearing and motor would be useful. FIG. 1 is provided primarily to give an illustrative example of the environment in which a motor incorporating the bearing comprising the features of the present invention is used; clearly, the motor could be used equally well in other designs of disc drives, or other operating environments apart from disc drive technology where minimizing the start and run power for the disc drive motor, and/or minimizing the overall height of the motor is a desirable feature.

More particularly, in FIG. 1 the storage system 10 includes a housing 12 having a spindle motor 14 which rotatably carries the storage disc or discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a set of radially differentiated tracks on the surface of the discs 16. This allows the transducers to read and write encoded information on the surface of the discs at selected locations. The discs rotate at very high speed, several thousand rpm, in order to maintain each transducer flying over the surface of the associated disc. In present day technology, achieving the high speed of rotation and maintenance of that high speed while utilizing minimum power if a very important goal.

A common characteristic of the reduced power fluid dynamic bearing design of the invention is the provision of a fluid dynamic bearing (FDB) without the traditional thrust washer or plate, but rather comprising a grooved thrust bearing defined between the end of the shaft and the opposing counterplate, and an opposing means for establishing a counter force in order to maintain the alignment of the relatively rotating parts in the system.

Figure 2:
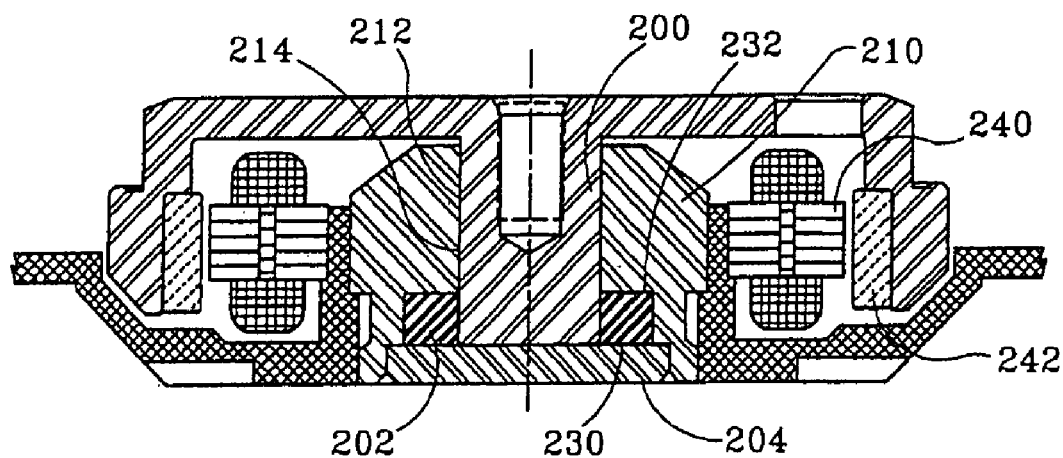
FIG. 2 illustrates the current single thrust plate design.

FIG. 2 illustrates the basic elements of a basic current technology single thrust plate design comprising a shaft 200 having a thrust plate 202 at an end thereof facing a counterplate 204. The shaft 200 and thrust plate 202 are supported for rotation relative to the sleeve 210 by a journal bearing 212 defined by grooves on one of the shaft 200 or sleeve 210 and fluid in the gap 214 between those two surfaces. The rotation of the shaft and thrust plate is further supported by thrust bearings defined between the axially facing surfaces 230, 232 of the thrust plate 202 and the facing surfaces of counter plate 204 and sleeve 210. Rotation of the shaft and thrust plate within the sleeve is established in accordance with well known principles by energization of the coils 240 of the stator in cooperation with the magnet 242.

Figure 3A:
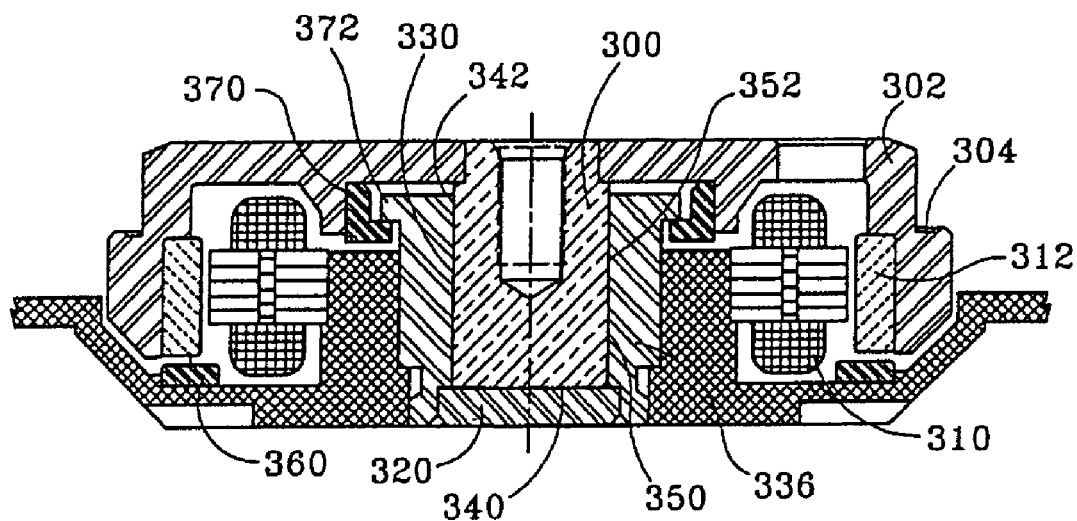
FIG. 3A illustrates an embodiment of the present invention.

A first embodiment of the present invention can be found in FIG. 3A, with a particular feature, that is the grooved design which is located on the base of the shaft facing the counter plate, base plate or equivalent, to support relative rotation of the shaft and sleeve being shown.

FIG. 3A shows a rotating shaft 300 supporting a hub 302 for rotation with the shaft. The hub 302 is clearly adapted to support one or more discs (not shown) on the shoulder 304 for constant high speed rotation. This rotation is established by the stator 310 which is mounted from the base cooperating with the magnet 312 which is mounted from the inner surface of the hub.

It can be seen that the end of the shaft, when the system is at rest, presses directly on counterplate 320. The base surface 321 of the shaft includes a grooved pattern 322 thereon as shown for example in FIG. 3B. Fluid is introduced into this gap under the urging of the grooved pattern when the shaft starts spinning from the gap 330 between the shaft 300 and the surrounding sleeve 336. This fluid is drawn into the shaft and thrust bearing region 325 to support relative rotation between the end of the shaft and the facing surface of the counterplate, the fluid being maintained in the gap 340 by the grooved pattern during rotation. Obviously, when the shaft comes to rest, the shaft end will rest on the plate 320 and, although the volume of fluid is very small, it will tend to be forced back out into the gap 330 between shaft 300 and sleeve 336. Therefore, space must be allowed in this gap 330 for this fluid. To prevent any loss of fluid, a capillary seal 342 is defined at the distal end of the gap 330 from the shaft/counterplate gap 340.

A journal bearing 348, as is well known in this technology is defined on the outer surface 350 of the shaft or the facing surface 352 of the sleeve utilizing the fluid in gap 330. This journal bearing 348 would have the dual function of supporting the shaft for rotation, and, if biased to accomplish this goal, could also tend to force fluid from the gap 330 toward the shaft/ counterplate gap 340.

To prevent the shaft from being displaced axially too far from the counterplate, since this is an axially upward thrust bearing 325 between the shaft end and counterplate, an opposing bias is typically introduced. This bias is utilized to prevent the gap 340 from becoming too large, which would reduce the effectiveness of the shaft thrust bearing 325. Approaches to this can be seen in the provision of a bias magnet 360 facing the motor magnet 312 and axially spaced therefrom. By selecting a suitable size and location for this bias magnet 360, an appropriate bias against the shaft being axially displaced too far from the counterplate 320 or the base can be introduced.

As a further alternative, the journal bearing in the gap 330 could be defined which the grooves proportioned to create a downward magnetic bias toward the shaft and/counterplate bearing 325 at gap 340. This journal bearing 348 aids in moving fluid from the journal gap 330 toward the thrust gap 340 especially at start-up and also during continuous run conditions.

Figure 3B:
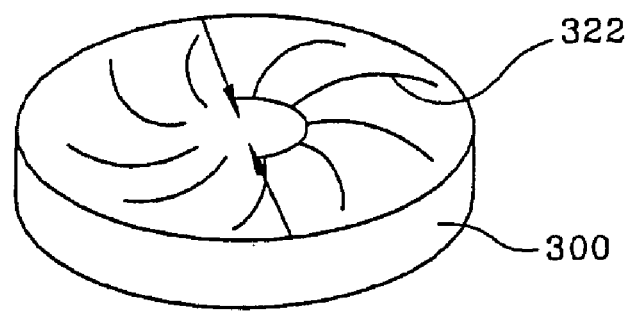
FIG. 3B illustrates one of several potential groove patterns useful on the end of the shaft 300 of FIG. A.
Figure 3C:
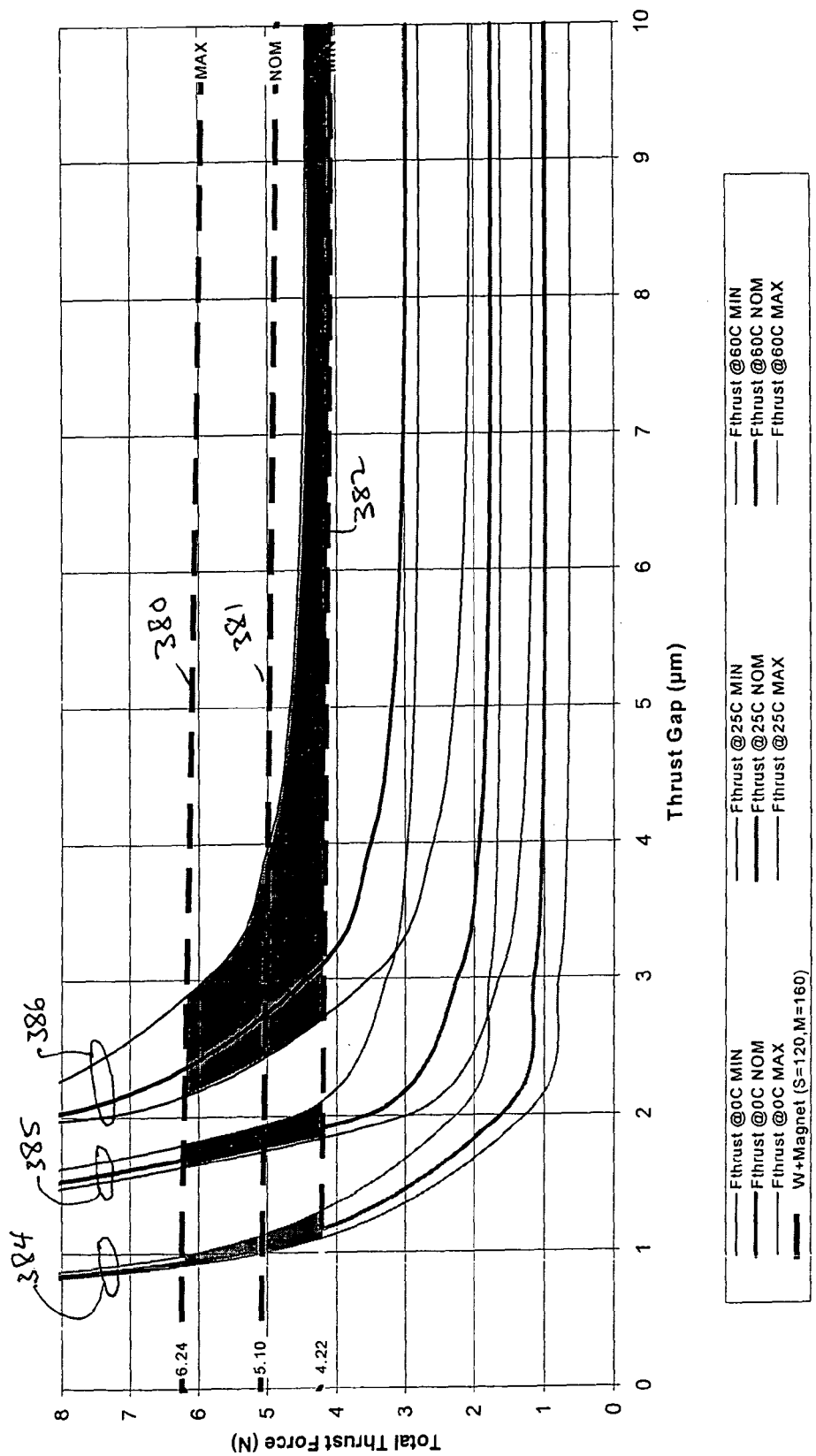
FIG. 3C illustrates the balancing of forces to optimize axial stiffness.

FIG. 3C illustrates the balancing of the axial forces achieved by the present design. Basically, the downward magnetic bias force is represented by the dashed lines 380–382; these lines includes the relatively small contribution of the weight of the shaft, typically about .15. The upward force is the combination of the journal asymmetry pressing force i.e. the force created by the bias of the journal bearing to force fluid into the thrust gap 350, together with the effective force of the plateless, shaft end thrust bearing. The reason for providing 3 sets of curves 384–386 at each temperature is to allow for the effect of tolerances in the journal bearing gap.

It is apparent from the FIG. 3C that it is desirable to operate in the shaded regions, with a thrust gap of 1–4 $\mu$m, which provides the optimum level of axial stiffness by minimizing the thrust bearing fly height.

Figure 4:
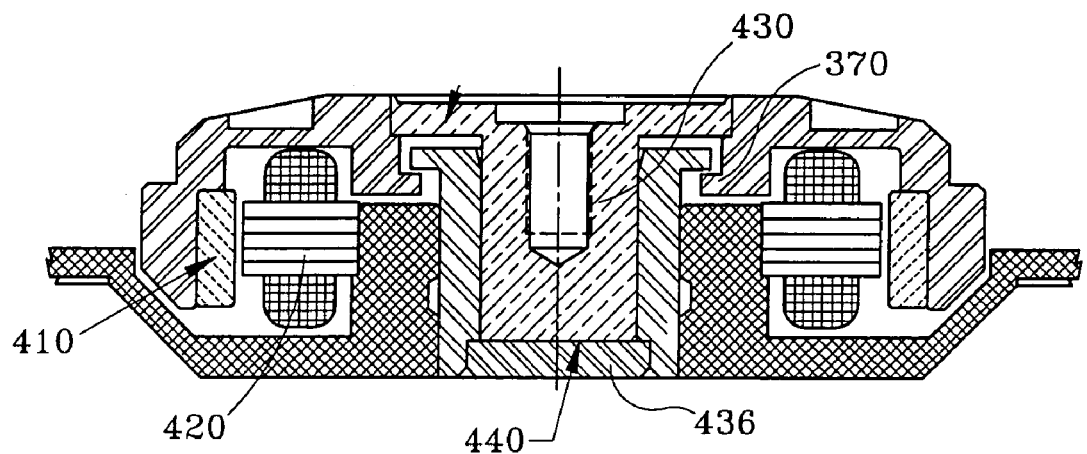
FIG. 4 illustrates an alternative embodiment of the present invention.

Yet another alternative would be as shown in FIG. 4 which shares most of the features of FIG. 3A, but includes a motor magnet 410 offset axially from the stator 420. This axial offset when properly measured and set, can create a force sufficient to prevent excessive axial displacement of the shaft 430 from its cooperating counterplate 436 under the influence of the fluid bearing in gap 440. Both of these figures also include a displacement limiting shoulder 370 which is supported from the rotating hub, and extends radially beneath a protruding arm 372 of sleeve 336. In this way, even under extreme shock conditions, despite the lack of a thrust plate, the shaft and hub cannot be totally disassembled or thrown out of alignment with the stator 310 and the journal sleeve 336.

Figure 5:
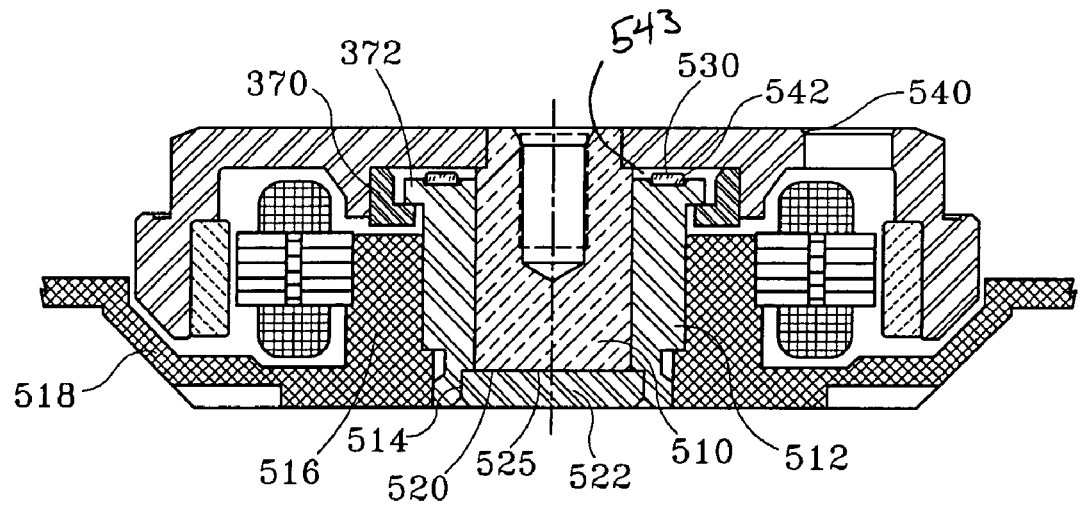
FIG. 5 illustrates a further alternative embodiment of the invention.

Referring next to FIG. 5, an alternative embodiment is shown having many of the same characteristic features as in FIGS. 3A, 3B, and 4, including the limiting shoulder 370 cooperating with the arm extension 372 on the sleeve. However, this embodiment includes a further magnetic bias means to provide all or a portion of the necessary magnetic bias to prevent undue movement of the end of the shaft 520 away from the counterplate 522, as illustrated in FIG. 3C. Such axial movement, if excessive, would diminish the effective stiffness of the fluid bearing in the gap 525 between these two surfaces. Therefore, a magnet 530 is mounted on a surface of the sleeve 512 inboard from the arm 372, and facing the metallic hub 540 across a gap 542. By selecting the size of the magnet 530 and the size of the gap 542 a magnetic bias can be introduced to maintain the end surface of shaft 510 in its position relative to the counterplate 522, so that the thrust bearing maintains its effectiveness. It should be further be noted that since this is a rotating shaft design, that the counterplate 522 is supported from the sleeve 512, which in turn rests on an arm 516 of base 518 in order to provide a highly stable design. This design is also preferred because of the location of magnet 540 on sleeve 512, aligned with the thrust bearing defined across gap 525. The magnet 540 location across the small gap 542 creates significant axial magnetic force to achieve the desired magnetic bias; the radial gap 543 adjacent magnet 542 is large, preventing the creation of undesirable radial forces.

Figure 6:
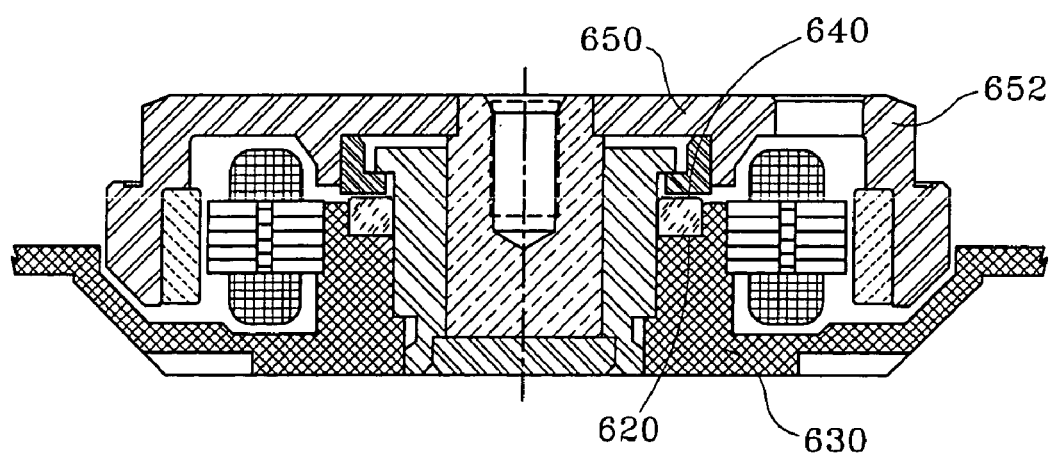
FIG. 6 illustrates yet another embodiment of the invention.

Yet another embodiment, that of FIG. 6 is similar in most respects to FIG. 5, except that in this embodiment the biasing magnet 620 is supported from the upraised shoulders 630 distal from base 632 and across a small gap 640 from the restraining shoulder 650 mounted on hub 652. This approach has the advantage of ease of assembly, since the magnet 620 can be located directly on the base shoulder 630, and may be easier to align across the gap 640 from the shoulder 650.

Figure 7:
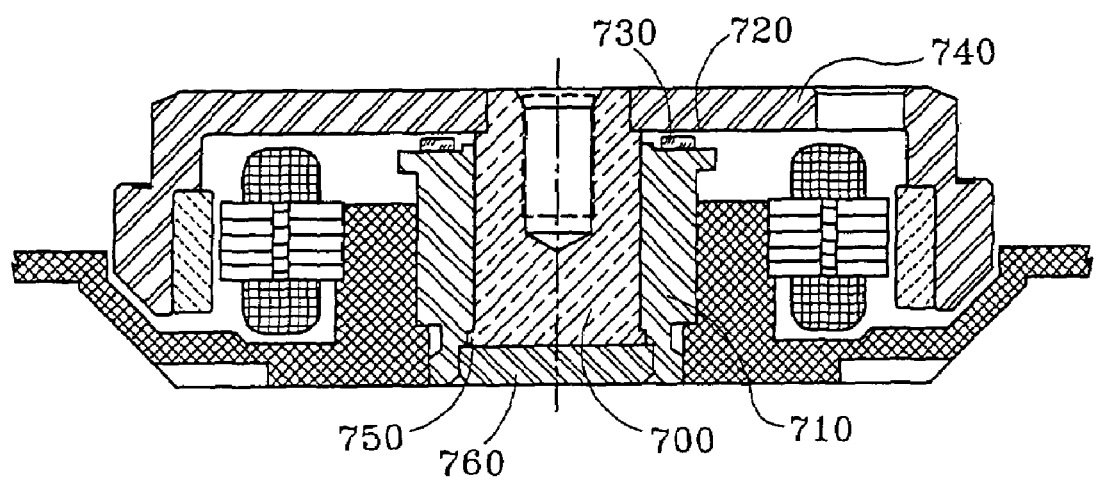
FIG. 7 illustrates a further alternative embodiment of the present invention.

A further embodiment, FIG. 7, shares many features of FIG. 5, but without the interlocking shoulders. The bias magnet 720 spaced across gap 730 from hub 740 to provide the magnetic bias taught in FIG. 3C. As a further enhancement, this figure also shows that a radially enlarged region 750 can be added to the sleeve 700 immediately adjacent the counterplate 760. This also provides an enlarged region for the end of shaft grooved pattern shown in FIG. 322, which enhances the effectiveness of the rotating shaft gap 770 on the fluid found in the gap.

A number of further alternatives may occur to a person of skill in the art who studies the above embodiments. To improve the wear capabilities of the above design, a ceramic counterplate may be used in any of the above embodiments since some wear of the counterplate when the spinning shaft comes to rest thereon would otherwise appear to be likely. A DLC coating could also be provided on either one of the surfaces of the shaft end and counterplate.

Figure 8:
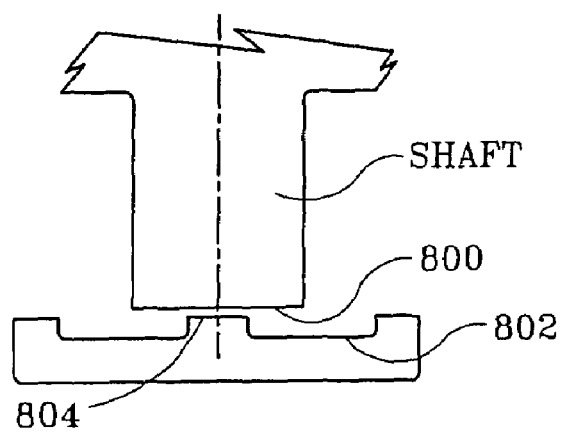
FIG. 8 illustrates a feature which may be incorporated into any of the above embodiments.

Yet a further alternative is shown in FIG. 8 which represents yet another approach to the problem of contact wear between the axially end of the shaft 800 and the facing surface of the counterplate 802. In this embodiment, which may be incorporated into any of the above approaches, an island 804 is defined in the center of the counterplate region 806 facing the axial end of the shaft 800. In fact, this island 804 could occupy only the ungrooved center region of the end of the shaft as it appears in FIG. 3B. This island could be defined employing ECM overburn on the axial bearing to create a higher island at the counterplate center 804 as shown, for low velocity (small surface) touchdown. As a further enhancement, the shaft could be formed of phosphor bronze for better wear coupling.

For improvements related to galling, the displacement limiter shoulder shown for example at FIG. 3 at 370 or 372 could comprise phosphor bronze; as a further alternative a DLC coating could be formed on the limiter shoulder.

In yet another improvement to be incorporated into this design, to allow for thermal compensation, that is the change in temperature between start up temperature and running temperature which reduces the viscosity of the fluid, a phosphor bronze shaft facing a steel sleeve could be used to offset the viscosity dropoff performance loss at higher temperatures. This also weakens the bearing at colder temperatures, thereby lowering the asymmetric pressure acting on the shaft end.

Figures 9A, 9B:
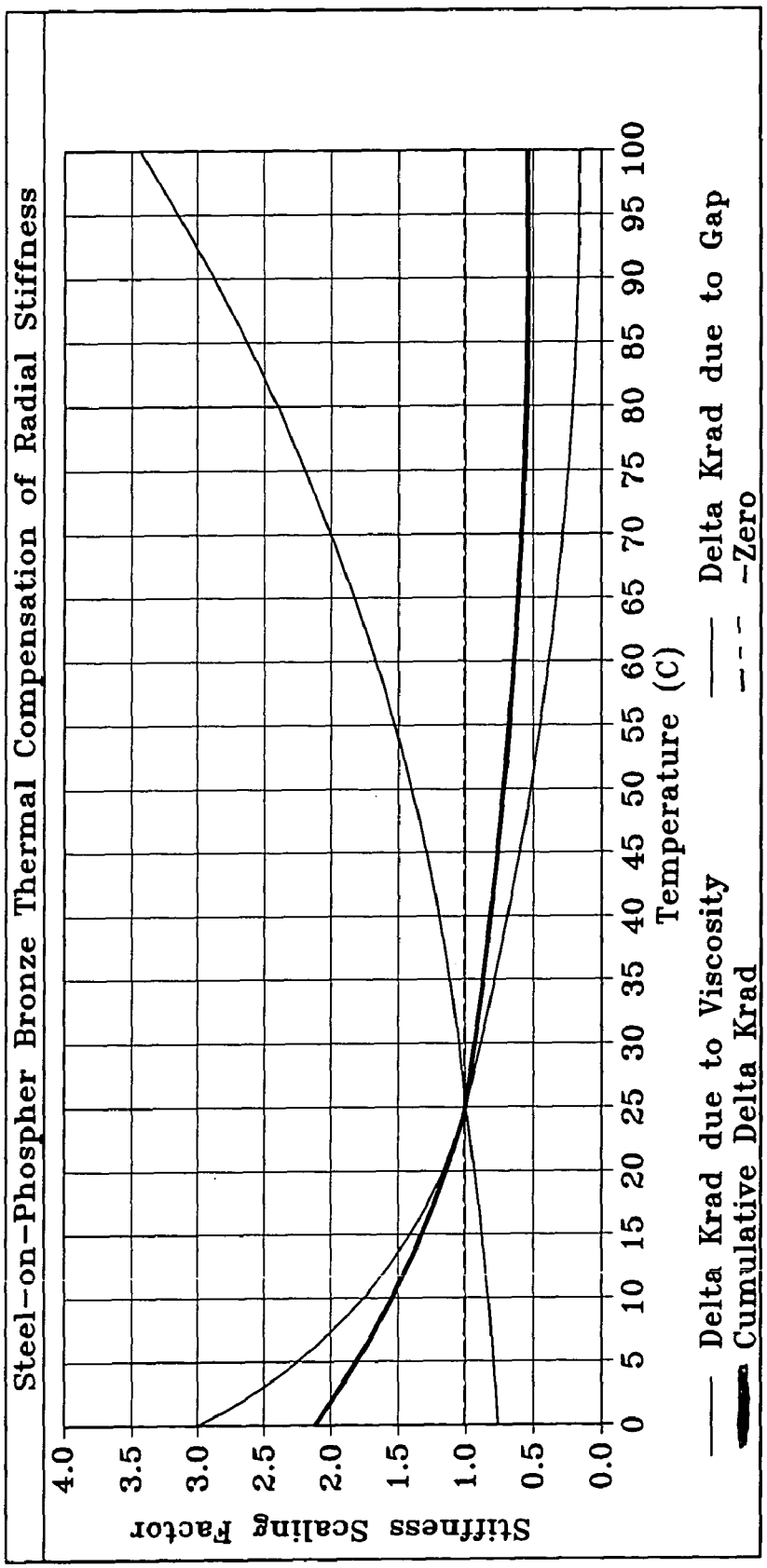
FIGS. 9A and 9B illustrate the selection of shaft and sleeve materials to achieve stiffness compensation.

The chart and graph of FIGS. 9A and 9B respectively illustrates the basis for selecting a combination of materials for shaft and sleeve to achieve stiffness compensation through gap change over a temperature range. The table of FIG. 9A shows radial stiffness changes over temperature for various material combinations. Noting especially the combination of phosphor bronze shaft and stainless steel sleeve, a reason for making this selection is that the phosphor bronze shrinks faster than steel as temperatures become lower. This opens the gap between the shaft and the sleeve, reducing the power consumed even as the viscosity of the fluid in the gap which provides the bearing surface increases. This conclusion is further borne out in FIG. 9B, which includes three different curves, the lines 910 for the combination of materials shown represents the changes in the gap with temperature and the effect on stiffness. The line 920 illustrates the change in viscosity with temperature and the resulting effect on stiffness. It can be seen from this curve that as the temperature drops, especially below 25° C., the viscosity of the fluid increases rapidly, increasing the stiffness, but also increasing the power consumption. The curve 910, in contrast, shows that as the temperature increases above 25° C., the gap shrinks and the effect of such shrinking gap on stiffness increases rapidly. The combined or cumulative effect of these two is shown in the line 930 which is the sum of the change in stiffness due to viscosity taken together with the change in stiffness due to gap change. It can be seen that the use of this combination of materials results in a stabilization of the stiffness of the system above 25° C., while diminishing the effect of increasing stiffness below that temperature, which would result in a lessening of the amount of power consumed.

Further studies, not illustrated here, have shown that a combination of a phosphor bronze shaft and ceramic sleeve, could also be highly beneficial and an improvement over the combination of a stainless steel shaft and sleeve; however, such a combination would also be more expensive to implement.

Figure 10:
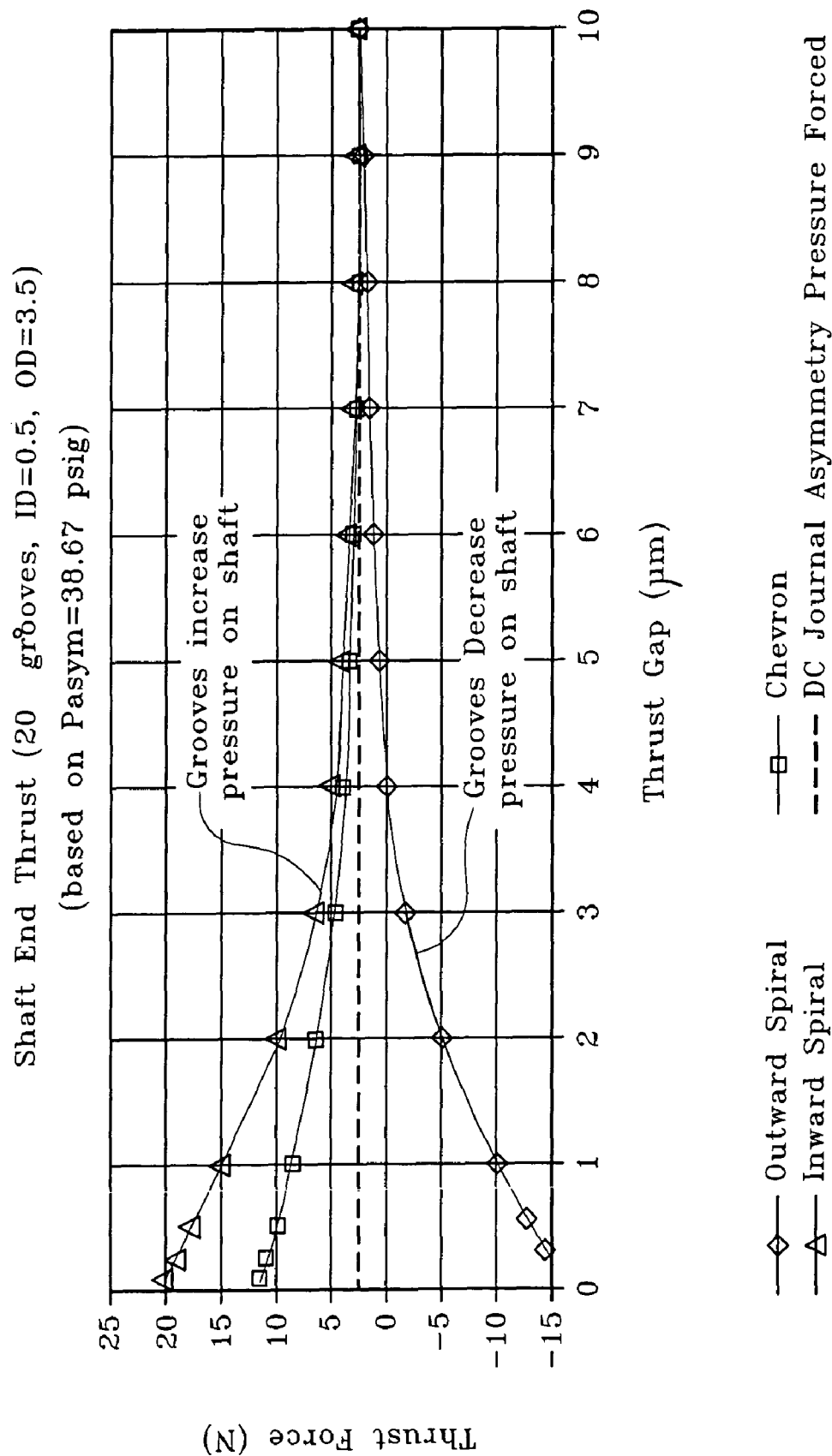
FIG. 10 illustrates the effectiveness of various groove patterns on the shaft end for maintaining shaft stability and gap spacing.

A further issue that must be dealt with in designs without a thrust plate is the proper design for the grooved pattern on the end of the shaft or, possibly on the counterplate facing the end of the shaft. FIG. 10 illustrates the results of three potential grooved patterns in this location. The curve 1010 is a chevron or herring bone pattern which tends to both draw fluid in between the end of the shaft and the facing counter plate, and maintain fluid in this gap at a fairly stable gap with end pressure. An alternative approach is an inward spiral, the results of which is shown in at line 1020 which will tend to increase the pressure on the shaft, thereby effectively again drawing the fluid in and maintaining the gap spacing.

In contrast, the alternative approach represented by an outward spiral illustrated at line 1030 would have the likely effect of pumping fluid out from the gap, thereby drawing the shaft down against the counterplate. This would be an undesirable result and therefore should not be used in the absence of other design considerations.

In summary, the present design provides a highly stable, low power consumption design with relatively low operating vibrations, and consuming power consistent with notebook and other devices where power consumption is a critical issue. The illumination of the thrust plate, in addition to lowering power consumption, provides the same stiffness as with thrust plate designs because of the added shaft length now available for journal bearing length. This journal bearing length can be utilized for either a single journal bearing or two journal bearings separated by a small ungrooved region. In either event, some small bias of the journal bearings toward the shaft end bearing the groove pattern is usually necessary or desired in order to accommodate the fact that when the motor is at rest, the shaft end will rest against the counterplate. Further, the capillary seal at the distal end of the journal from the shaft grooved design should be sized to accommodate the fact that there will be some small increase in fluid in the journal gap when the motor comes to rest because of the shaft end coming to rest against the counterplate.

It should be noted that a further benefit of this design is that the grooved thrust bearing is fully thermally compensated to have substantially the same stiffness at any temperature. A further advantage of this design is that the journal and thrust bearing thermal compensation effects serve to limit bearing drag and power fluctuation with temperature.

It should also be understood that these design principles could be applied to a fixed shaft design. Other features and advantages of this invention will be apparent to a person of skill in the art who studies this disclosure. Therefore, the scope of the invention is to be limited only by the following claims.

What is claimed is:

1. A fluid dynamic bearing comprising a shaft supporting a hub at one end, the shaft being adapted to rotate within a sleeve supported from a base, the base including a counterplate facing an end of the shaft distal from the one end on which the hub is mounted, the shaft being supported for rotation within the sleeve by a biased journal bearing comprising fluid in the gap between the shaft and the sleeve, one of the distal end of the shaft or the surface of the counterplate which faces the end face of the shaft having a grooved pattern thereon to maintain fluid in the gap between the shaft and the counterplate, wherein the distal end of the shaft has an outer radial surface at a first radial distance from the center of the shaft and the grooved pattern is disposed within the first radial distance thereby supporting the shaft for rotation relative to the counterplate and sleeve, wherein at least one of the shaft or a center of the counterplate comprises a raised island defining a small touchdown surface for the bottom surface of the shaft, thereby reducing wear on the surfaces of the fluid dynamic bearing defined by the bottom surface of the shaft and the facing surface of the counterplate.

2. A fluid dynamic bearing motor as claimed in claim 1 further comprising a first magnet supported on the hub, the magnet being axially offset from the spindle and more distant from the base supporting the fluid dynamic bearing to establish an electro-magnetic bias working against separation of the base of the shaft from the counterplate.

3. A fluid dynamic bearing as claimed in claim 1, wherein the hub includes a first shoulder which extends axially beneath a cooperating second shoulder included on an outer surface of the sleeve surrounding the shaft, the first and second shoulders cooperating to limit axial displacement of the hub and the shaft relative to the sleeve.

4. A bearing as claimed in claim 3 further comprising a biasing magnet supported on an end of the sleeve distal from the base across a relatively narrow gap from the hub, the biasing magnet and hub cooperating to limit the gap between the shaft end face and the counterplate.

5. A bearing as claimed in claim 4 wherein the shaft comprises phosphor bronze, and the sleeve comprises stainless steel.

6. A fluid dynamic bearing as claimed in claim 1 further comprising a biasing magnet supported on a shoulder extending axially from the base and supporting on a outer surface thereof the stator of the motor in alignment with the motor magnet supported on the hub, the biasing magnet being located across a gap from a shoulder piece supported from the hub, the biasing magnet and shoulder cooperating to prevent undue displacement of the shaft end face and hub relative to the base.

7. A fluid dynamic bearing as claimed in claim 1 wherein the center region which comprises the raised island faces an ungrooved region in a center of the grooved bottom surface of one of the shaft or counterplate center.

8. A fluid dynamic bearing as claimed in claim 1 wherein the journal bearing is biased to create asymmetric fluid pressure toward the end face of the shaft, thereby supplying fluid to the thrust bearing between the shaft end face and the sleeve.

9. A fluid dynamic bearing as claimed in claim 8 wherein one of the end face of the shaft and the counterplate is coated with a diamond-like coating.

10. A fluid dynamic bearing as claimed in claim 6 wherein one of the counterplate or shaft comprises a ceramic material.

11. A spindle motor for use in a disc drive comprising a shaft rotating in a bore defined by an inner surface of a sleeve, the shaft being supported for rotation by a biased fluid dynamic journal bearing comprising fluid in a gap between the shaft and the sleeve, the shaft supporting a hub at one end, the shaft being adapted to rotate within the sleeve supported from a base, the base including a counterplate facing an end of the shaft distal from the one end on which the hub is mounted, one of the distal end of the shaft or the surface of the counterplate which faces the end face of the shaft having a grooved pattern thereon to maintain fluid in the gap between the shaft and the counterplate, wherein the distal end of the shaft has an outer radial surface at a first radial distance from the center of the shaft and the grooved pattern is disposed within the first radial distance, thereby supporting the shaft for rotation relative to the counterplate and sleeve, wherein at least one of the shaft or a center of the counterplate comprises a raised island defining a small touchdown surface for the bottom surface of the shaft, thereby reducing wear on the, surfaces of the fluid dynamic bearing defined by the bottom surface of the shaft and the facing surface of the counterplate.

12. A spindle motor as claimed in claim 11 further comprising a magnet supported on the hub, the magnet being axially offset from the spindle, and more distant from the base supporting the fluid dynamic bearing to establish an electromagnetic bias affecting the gap between the base of the shaft and the counterplate.

13. A spindle motor as claimed in claim 11, wherein the hub includes a first shoulder which extends axially beneath a cooperating second shoulder included on an outer surface of the sleeve surrounding the shaft, the first and second shoulders cooperating to limit axial displacement of the hub and the shaft relative to the sleeve.

14. A spindle motor as claimed in claim 11 further comprising a bias magnet supported on an end of the sleeve across a relatively narrow gap from the hub, the biasing magnet and hub cooperating to affect the gap between the end face of the shaft and the counterplate.

15. A bearing as claimed in claim 11 wherein the shaft comprises phosphor bronze, and the sleeve comprises stainless steel.

16. A fluid dynamic bearing comprising a shaft supporting a hub at one end, the shaft being adapted to rotate within a sleeve supported from a base, the base including a counterplate facing an end of the shaft distal from the one end on which the hub is mounted, the shaft being supported for rotation within the sleeve by fluid in the gap between the shaft and the sleeve, and a biased means associated with the distal end of the shaft and the surface of the counterplate for supporting the shaft for rotation relative to the counterplate and sleeve, wherein the distal end of the shaft has an outer radial surface at a first radial distance from the center of the shaft and the biased means is disposed within the first radial distance and wherein at least one of the shaft or a center of the counterplate comprises a raised island defining a small touchdown surface for the bottom surface of the shaft, thereby reducing wear on the, surfaces of the fluid dynamic bearing defined by the bottom surface of the shaft and the facing surface of the counterplate.

17. A fluid dynamic bearing as claimed in claim 16, wherein said supporting means further comprising means for magnetically biasing the shaft within the sleeve to maintain the gap between the end face of the shaft and the counterplate.

18. A fluid dynamic bearing is claimed in claim 16 further comprising means associated with the sleeve and the hub for preventing loss of alignment of the draft and the sleeve under shock.

19. A fluid dynamic bearing comprising a shaft supporting a hub at one end, the shaft being adapted to rotate within a sleeve supported from a base, the base including a counterplate facing an end of the shaft distal from the one end on which the hub is mounted, the shaft being supported for rotation within the sleeve by a biased journal bearing comprising fluid in the gap between the shaft and the sleeve, one of the distal end of the shaft or the surface of the counterplate which faces the end face of the shaft having a grooved pattern thereon to maintain fluid in the gap between the shaft and the counterplate, thereby supporting the shaft for rotation relative to the counterplate and sleeve, wherein the journal bearing is biased to create asymmetric fluid pressure toward the end face of the shaft, thereby producing pressure on an end of the shaft to lift the shaft independently of the thrust gap.

20. A fluid dynamic bearing motor as claimed in claim 19 further comprising a first magnet supported on the hub, the magnet being axially offset from the spindle and more distant from the base supporting the fluid dynamic bearing to establish an electro-magnetic bias working against separation of the base of the shaft from the counterplate.

21. A fluid dynamic bearing as claimed in claim 19, wherein the hub includes a first shoulder which extends axially beneath a cooperating second shoulder included on an outer surface of the sleeve surrounding the shaft, the first and second shoulders cooperating to limit axial displacement of the hub and the shaft relative to the sleeve.

22. A bearing as claimed in claim 19 further comprising a biasing magnet supported on an end of the sleeve distal from the base across a relatively narrow gap from the hub, the biasing magnet and hub cooperating to limit the gap between the shaft end face and the counterplate.

23. A bearing as claimed in claim 19 wherein the shaft comprises phosphor bronze, and the sleeve comprises stainless steel.

24. A fluid dynamic bearing as claimed in claim 19 further comprising a biasing magnet supported on a shoulder extending axially from the base and supporting on a outer surface thereof the stator of the motor is alignment with the motor magnet supported on the hub, the biasing magnet and shoulder cooperating to prevent undue displacement of the shaft end face and hub relative to the base.

25. A fluid dynamic bearing as claimed in claim 19 wherein at least one of the shaft or a center of the counterplate comprises a raised island defining a small touchdown surface for the bottom surface of the shaft, thereby reducing wear on the surfaces of the fluid dynamic bearing defined by the bottom surface of the shaft and the facing surface of the counterplate.

26. A fluid dynamic bearing as claimed in claim 19 wherein the center region which comprises the raised island faces an ungrooved region in a center of the grooved bottom surface of one of the shaft or counterplate center.

27. A fluid dynamic bearing as claimed in claim 19 wherein one of the end face of the shaft and the counterplate is coated with a diamond-like coating.

28. A fluid dynamic bearing as claimed in claim 19 wherein one of the counterplate or shaft comprises a ceramic material.

* * * * *

UNITED STATES PATENT AND TRADEMARK OFFICE
CERTIFICATE OF CORRECTION

PATENT NO. : 6,982,510 B1
DATED : January 3, 2006
INVENTOR(S) : Anthony J. Aiello et al.

It is certified that error appears in the above-identified patent and that said Letters Patent is hereby corrected as shown below:

Title page,
Item [75], Inventors, "Anthony Joseph Ajello" with -- Anthony Joseph Aiello --.

Signed and Sealed this

Fourteenth Day of March, 2006

JON W. DUDAS
*Director of the United States Patent and Trademark Office*